(12) United States Patent
Lawrence

(10) Patent No.: US 12,063,199 B1
(45) Date of Patent: *Aug. 13, 2024

(54) GLOBAL PORTAL NETWORK—GODIRECT

(71) Applicant: Dean Wray Lawrence, Bowie, MD (US)

(72) Inventor: Dean Wray Lawrence, Bowie, MD (US)

( * ) Notice: Subject to any disclaimer, the term of this patent is extended or adjusted under 35 U.S.C. 154(b) by 62 days.

This patent is subject to a terminal disclaimer.

(21) Appl. No.: 17/736,049

(22) Filed: May 3, 2022

Related U.S. Application Data

(63) Continuation-in-part of application No. 15/976,670, filed on May 10, 2018, now Pat. No. 11,061,981.

(51) Int. Cl.
| | | |
|---|---|---|
| *H04L 12/00* | (2006.01) | |
| *H04L 61/45* | (2022.01) | |
| *H04L 61/5007* | (2022.01) | |
| *H04L 101/365* | (2022.01) | |
| *H04L 101/37* | (2022.01) | |
| *H04L 101/69* | (2022.01) | |

(52) U.S. Cl.
CPC ...... *H04L 61/5007* (2022.05); *H04L 61/4547* (2022.05); *H04L 2101/365* (2022.05); *H04L 2101/37* (2022.05); *H04L 2101/69* (2022.05)

(58) Field of Classification Search
CPC ............. H04L 61/5007; H04L 61/4547; H04L 2101/37; H04L 2101/69
USPC .................................................. 709/204–206
See application file for complete search history.

(56) References Cited

U.S. PATENT DOCUMENTS

| | | | | |
|---|---|---|---|---|
| 11,061,981 B2 * | 7/2021 | Lawrence | ........... | G06F 16/9538 |
| 2014/0082064 A1 * | 3/2014 | Nicks | ...................... | H04L 67/01 |
| | | | | 709/203 |

* cited by examiner

*Primary Examiner* — Frantz Coby

(57) ABSTRACT

The invention is an improvement to an originally patented invention titled the Global portal network that allows the use of any domain name followed by a name or email address in the address bar of any internet browser to, using an algorithm that is part of the platform, generate and implement a query that will cause the internet browser to publish information stored in an active directory system and/or database that is on the platform.

9 Claims, No Drawings

GLOBAL PORTAL NETWORK—GODIRECT

BACKGROUND OF THE INVENTION

1. Field of the Invention

The invention relates generally to the prior invention named the Global Portal Network. The prior invention, the Global Portal Network pertains to a system for creating a comprehensive or global community-based portal network capable of including every currently named community in the world or communities to be created and/or named at a future time to quickly and efficiently provide access to information including but not limited to products, services and/or issues. In order to improve on the effectiveness and efficiency of the Global Portal Network, a new capability is invented.

Understanding that each individual or entity occupies a unique position, physical space and relevant information, the inventor finds that a more efficient way for the Global Portal Network to streamline access to geographic information is to provide an option to include a name or email address after any domain name as was claimed in the previous invention, the Global Portal Network.

The current invention which is an improvement to the Global Portal Network, therefore more particularly pertains to a new system for creating a more efficient and focused platform capable of including every currently named person in the world or persons to be named at a future time. The invention specifically focuses on providing streamlined access to information including but not limited to geographic regions, products, services and/or issues to an individual or entity by assigning or associating an existing name or email address as part of an identifier.

2. Description of the Prior Art

The Global Portal Network is a platform that provides access to regionally focused data, resources, services and other information by allowing the use of any domain name followed by the name of any country, local municipality or neighborhood in the address bar of any internet browser to, using an algorithm that is part of the platform, generate and implement a query that will cause the internet browser to publish information stored in an active directory system and/or database that is on the platform.

While the Global Portal Network fulfill the respective, particular objectives and requirements, the original invention did not include the ability to narrow the geographic focus to begin at the specific location of an individual or entity. This ability would increase efficiencies, time and expenses as well as create a more comprehensive community portal network that covers all the communities and inhabited locations around the world.

SUMMARY OF THE INVENTION

The current invention which is an improvement to the Global Portal Network, more particularly pertains to a new system for creating a more efficient and focused platform capable of including any currently named person in the world or persons to be named at a future time. The invention specifically focuses on the providing streamlined access to information including but not limited to geographic regions, products, services and/or issues to an individual or entity by assigning or associating an existing name or email address as an identifier.

The general purpose of the present invention, which will be described subsequently in greater detail, is to improve on the global portal network.

To attain this, the inventive system/invention generally comprises:

a) a database for storing the names and email addresses of individuals or entities;

b) an active directory system that reflects the geographic region along with the names and email addresses in the database;

c) a software architecture or system of programs to create a geographic identifier;

d) a software architecture or system of programs to display the relevant website content or information associated with the identifier and URL or keyword(s);

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is the purpose or object of the present invention to improve on a prior invention, the global portal network, which may be easily and efficiently developed, published and marketed.

It is a further object of the present invention to improve the global portal network which is available for use on multiple types of browsers and Internet able devices.

An even further object of the present invention is to improve on the global portal network which is susceptible of low development and maintenance cost which accordingly is then susceptible of low prices of sale/franchising to the consuming public, thereby making usage of the network economically available to the buying public.

Still yet another object of the present invention is to improve on the global portal network which provides in the apparatuses and methods of the prior art some of the advantages thereof, while simultaneously overcoming some of the disadvantages normally associated therewith.

Still another object of the present invention is to improve on the global portal network allowing users to create their own account which will allow a single access to login to all programs or services that is part of the network.

Yet another object of the present invention is to improve on the global portal network which includes a framework to provide:

1. A system to allow easy access to the webpage and information posted by the users list of family members, friends, and neighbors. 2. Links for promoting the network or any specific community gateway or page within the network across the Internet using email services or other social media platforms. 3. Multiple language options for displaying the information on the network. 4. A system for rating or providing feedback on each product, service or page on the network. 5. A system for allowing the user to easily manage their information that is displayed on the network. 6. A system for allowing the user to provide access to other users to interact with their data and browse the information available. 7. A system for allowing the user to access any community gateway by using a specific or constant domain name along with the name or email address entered in the address bar of any browser.

Still yet another object of the present invention is to improve on the prior invention, the global portal network, that helps further enhance a user's experience when using the system so that the user feels less than three clicks away from finding any information, data or service on the network.

Another object of the present invention is to improve on the global portal network that publishes information and delivers services provided by community development programs that may be provided by individuals or organizations. The improvement provided in the new invention enhances a user's experience by allowing a more direct access to information, data or services provided as part of community development programs. Some current programs supported by the invention include bet is by no means limited to:

YOUR COMMUNITY CONSULTANTS is a program whereby users can find a list of consultants that provide any and all services allowed by law within the community and submit a request for Service from the select consultant(s).

JOBS IN YOUR COMMUNITY is a program that allows users to browse a list of local businesses/employers from local industries and submit a resume that is accessible on the system by the potential employer to view and download the resume.

THE DEANS LIST FUND is a program that allows users to promote business startups or a new business idea to get capital financing with the help of friends, family, other members of the community, and investors from around the world.

YOUR ASSESSMENT SERVICES is a program that allows users to select from a variety of proprietary tools and systems to complete personal and industry specific assessment to suit their personal or business needs.

YOUR COMMUNITY SURPLUS is an online marketplace that allows users to browse from the broad list of product categories to find items listed for sale at discounted prices.

GET FREE HEALTH SCREENINGS is a program that allows users to find the local healthcare providers and organizations that provide free health screenings and other medical services and make appointment(s) for services.

RODE DELIVERY SERVICES is a program that allows users to request delivery services with that is available with online tracking and updates on the status of their package(s) or service request.

I-KART RACING is a program that allows users to experience computer and/or Internet based go-kart racing on a variety of tracks all from around the world while competing with other local users and users from around the world.

YOUR COMMUNITY GAMERS is a program that allows users to connect with other local users or anywhere in the world and schedule online gaming events that allows community groups to compete against each other.

GLOBAL FAMILY CARE is a program that allows users to find and connect with local Healthcare Professionals and to setup appointments through a process that is fast, quick and easy)

YOUR COMMUNITY HELPDESK is a program that allows users to request services from local professionals to support their personal, household and business needs.

TRUTH IN LEADING is a program that allows users to compare the records of local leaders and their positions on a range of issues and questions affecting the local communities.

YOUR COMMUNITY B&B is a program that allows users to find local places to stay and make reservations.

YOUR COMMUNITY PULSE is a program that allows users to view and complete local opinions polls regarding and focused on important issues of concern.

YOUR FITNESS SERVANT is a program that allows users to find local trainers and programs and enroll in their various programs and exercise schedules.

YOUR NEIGHBORHOOD LISTINGS is a program that allows users to find information relevant to Buying, Selling or Renting Real estate and other local industry professionals including—Realtors, Appraisers, Loan Specialists, Rental agencies, Movers, Storage etc.

KNOW YOUR LOCAL NGOS is a program that allows users to connect with non-profits and social services organizations and find support on critical issues including, poverty, depression, domestic violence, addiction and more.

USED AUTO PARTS NETWORK is a program that allows users to connect with other users to find used parts from nearly every make and model of automobile.

COMMUNITY NEWS NETWORK is a program that allows users to stay connected with other users video commentaries and perspectives on current issues and events.

YOUR COMMUNITY BILLBOARD is a program that allows users to provide advertising space within each local community on the network.

The present invention allows programs like to those mentioned above to provide a name or email address specific and focused portal by entering the domain name of the service followed by a name or email address in the address bar of any internet browser. (example-www.yourcommunitybillboard.com/name or email address)

Even still another object of the present invention is to is to improve on the global portal network that allows the user to become exclusive regional franchise partners/owners of each of the community portals or development programs that is part of the network.

DESCRIPTION OF THE PREFERRED EMBODIMENT

The system creates unique identifiers based on the names and email addresses stored as part of the database. The database design will allow for holding a record of every name or email address already existing or yet to be created or listed in all countries. The names or email addresses are uniquely identified based on the subdivisions to which the names or email addresses belongs. While the system does not require a specific number of subdivisions for identifying each name or email address, it does require that each name or email address is uniquely identifiable when the divisions are listed and separated by a specified delineator. The delineator used in the invention is the comma (,).

The invention includes a user interface that will streamline the process of 1. Adding the names or email addresses information for each geographic community or neighborhood to the tables within the database and 2. Creating a computer directory system that reflects the names or email addresses listed in the database.

An example of a unique combination of subdivisions that create the unique identifier for each geographic community is as follows: Country, Subdivision1, subdivision2, community, names or email address;

An example of a unique combination of subdivisions that create the unique identifier for each geographic neighborhood is as follows;

County, Subdivision1, subdivision2, community, neighborhood, name or email address. 1.

Each directory is created by using an algorithm that separates the string submitted (the string listed above in the example) and creates a series of directories with the top directory being named to match the first item in the comma delineated string, and a corresponding subdirectory named to match each sequential item from the delineated string.

The algorithm also adds the delineated data to a table in the database that holds all the items in a single shared unique row, with each item in a separate column that identifies the category of information according to the type of geographic subdivision (example—country, region, subregion, community, neighborhood, name or email address).

The database may be queried for data in the columns that identify the communities and the neighborhoods and if the data is found, a corresponding identifier is created and passed to a url or community portal that will manage information specific to that name or email address.

The invention includes a system for adding each unique identifier to a url or domain name that may identify and provide specific information, products or services. Consequently, the invention allows the domain name www.domainname.com/namesoremailaddresses to open the portal with information that is specific to the subject as well as the name or email address.

The invention also includes a user interface or management system that provides controlled access to the directories that hold the information relevant to each name or email address. Consequently, the invention provides a system that:

1. Creates significant value by streamlining access to any/all types of descriptive information that are or may be indexed on the internet including but not limited to information about neighborhoods, websites, products, services, individuals, events and jobs 2. Creates a regional franchise model for providing products and services within the identified communities whereby an individual or business entity may hold ownership of the services and products provided by the system with the franchised community or region.

DESCRIPTION OF THE INVENTION

The invention includes a method that simplifies and adds a systemic feature or characteristic to how the region identifier is added to the domain name or URL. Consequently, any domain name can include a regional identifier by simply adding the email address, or name of an individual or entity after the domain name as shown. Example—http://www.domainname.com/name or email address.

The invention relates to an Information management system that will allow Uniform Resource Locators (URIs) including domain names, IP addresses or keywords processed by the invention to produce a relevant geographic identifier that will correspond with the resulting website or page that will carry that identifier as part of its content. The identifier may be created using any format available in any programming language. The current formats used include web-based cookies, URL variables or combination of both variables and cookies.

This invention also involves using an information management system to display any/all types of descriptive information that are or may be indexed on the internet including but not limited to information about neighborhoods, websites, products, services, individuals, events and jobs.

The invention also includes a method for franchising business models wherein the geographic areas stored by the information management system may be franchised and serviced by a plurality of individuals or organizations.

The business models being franchised may include but not be limited to organizations that provide consumer services, business services, public services, manufacturing services and construction services. The Information management system comprises the steps including but not limited to:

a) a database for storing the geographic regions, municipal communities, email addresses and names;
b) an active directory system that reflects the geographic regions, email addresses and names in the database;
c) a software architecture or system of programs to create a geographic identifier;
d) a software architecture or system of programs to display the relevant website content or information associated with the identifier and URL or keyword(s).

The invention claimed is:

1. A system for adding a name or an email address to a domain name in an address bar of any browser-(www.domainname/name or email), to generate and implement a regionally focused query that will cause the browser, to publish information that is associated with the regionally focused query, the system comprising a Global Portal Network wherein the Global Portal Network is an information management system that is deployed on an internet-based server, the Global Portal Network consists of 3 main components; a database, a directory structure and a software/programming code designed to manage or produce the Global Portal Network's functionality, wherein a) the database contains tables that are designed to hold a comprehensive list of geographic communities around the world, the geographic communities are grouped in 5 sub-regions regardless of the country to which they belong, said 5 sub-regions categorized as country, state, county, municipality, neighborhood where country is subregion1 and the neighborhood is subregion5;
b) the active directory structure matches the grouping of the geographic communities that are listed in the database, each country directory would include a directory with the name of each state within the country, each state directory would include a directory with the name of each county within the state, each county directory would include a directory with the name of each municipality within the County, each municipality directory would include a directory with the name of each residential neighborhood within the municipality; and c) the software/programming code includes an algorithm on an index page allowing the use of any domain name that is directed to the Global Portal Network followed by the name of any person or email in the address bar of any internet browser to, generate and implement a query that will cause the internet browser to publish information stored in a directory system and/or database that is on the Global Portal Network.

2. The system of claim 1, wherein a name or email address is added as a variable to a domain name to create a regional franchise or focus to any service, issue or category of information.

3. The system of claim 1, wherein each name and/or email address is available as a regional franchise.

4. The system of claim 1, wherein the Global Portal Network is available for use in every language and dialect available on the internet.

5. The system of claim 1, wherein information published by the Global Portal Network allows a user(s) of the Global Portal Network to use an algorithm to request services listed in the published information and a requested service(s) is submitted to a user or plurality of users of the Global Portal Network.

6. The system of claim 1, wherein an algorithm within the Global Portal Network is used to submit a keyword(s) to generate and implement a query that will cause the internet browser, to publish stored information that is associated with the regionally focused query.

7. The system of claim 1, wherein the names and email address within the database is used to generate a unique identifier(s) and also used to create the directory framework for storing information within the Global Portal Network.

8. The system of claim 1, wherein users can add and manage information within the network so that the information is available for publishing by any internet browser based on queries generated and implemented by an algorithm that is part of the Global Portal Network.

9. The system of claim 1, comprising but not limited to the following:
   a) a database for storing names and email addresses
   b) a directory system that reflects the names and email addresses in the database
   c) an algorithm to generate and implement a regionally focused query based on the domain name and name or email address entered in the address bar of an internet browser or based on keyword(s) entered and submitted in a form created by an algorithm within the Global Portal Network
   d) an algorithm to generate and display information stored in the directory system and/or database that is part of the Global Portal Network.

\* \* \* \* \*